United States Patent
Hale et al.

(10) Patent No.: US 6,329,462 B1
(45) Date of Patent: Dec. 11, 2001

(54) NYLON 6/SILICONE BLENDS

(75) Inventors: Wesley R. Hale, Kingsport; David Logan Murray, Fall Branch; Allan Scott Jones, Limestone, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/517,464

(22) Filed: Mar. 2, 2000

Related U.S. Application Data

(60) Provisional application No. 60/140,256, filed on Jun. 18, 1999.

(51) Int. Cl.⁷ .................................................. C08K 54/19

(52) U.S. Cl. ........................... 524/731; 524/718; 525/431

(58) Field of Search ............................ 525/431; 524/731, 524/718

(56) References Cited

U.S. PATENT DOCUMENTS

| | | |
|---|---|---|
| 2,891,920 | 6/1959 | Hyde et al. . |
| 3,294,725 | 12/1966 | Findlay et al. . |
| 3,384,653 | 5/1968 | Erner et al. . |
| 3,394,164 | 7/1968 | McClellan et al. . |
| 3,642,964 | 2/1972 | Rausch, Jr. et al. . |
| 3,644,457 | 2/1972 | König et al. . |
| 3,755,221 * | 8/1973 | Hitch .................................. 260/18 N |
| 3,779,969 | 12/1973 | Slagel et al. . |
| 3,883,571 | 5/1975 | Allport et al. . |
| 3,985,703 | 10/1976 | Ferry et al. . |
| 4,031,026 | 6/1977 | Ibbotson . |
| 4,115,429 | 9/1978 | Reiff et al. . |
| 4,118,411 | 10/1978 | Reiff et al. . |
| 4,163,002 | 7/1979 | Pohl et al. . |
| 4,177,177 | 12/1979 | Vanderhoff et al. . |
| 4,180,494 | 12/1979 | Fromuth et al. . |
| 4,202,957 | 5/1980 | Bonk et al. . |
| 4,204,049 | 5/1980 | Matthies et al. . |
| 4,259,478 | 3/1981 | Jackson, Jr. et al. ................. 528/307 |
| 4,366,306 | 12/1982 | Smith . |
| 4,370,160 | 1/1983 | Ziemelis . |
| 4,376,834 | 3/1983 | Goldwasser et al. . |
| 4,393,153 | 7/1983 | Hepp . |
| 4,414,362 | 11/1983 | Lenke et al. . |
| 4,458,050 | 7/1984 | Heyman . |
| 4,472,338 | 9/1984 | Hermann et al. .................. 264/210.6 |
| 4,474,918 | 10/1984 | Seymour et al. . |
| 4,495,324 | 1/1985 | Chacko et al. . |
| 4,567,236 | 1/1986 | Goldwasser et al. . |
| 4,568,616 | 2/1986 | Seifried et al. . |
| 4,578,437 | 3/1986 | Light et al. . |
| 4,599,393 * | 7/1986 | Policastro .............................. 528/12 |
| 4,618,642 | 10/1986 | Schoenherr . |
| 4,675,372 | 6/1987 | Policastro . |
| 4,708,986 | 11/1987 | Gerth et al. . |
| 4,788,001 | 11/1988 | Narula . |
| 4,810,763 | 3/1989 | Mallya et al. . |
| 4,885,350 | 12/1989 | Yamashita et al. . |
| 4,904,733 | 2/1990 | Gerth et al. . |
| 4,954,565 | 9/1990 | Liles . |
| 4,977,213 | 12/1990 | Giroud-Abel et al. . |

(List continued on next page.)

FOREIGN PATENT DOCUMENTS

| | | |
|---|---|---|
| 2019716 | 1/1991 | (CA) . |
| 0581224 | 2/1984 | (EP) . |
| 0232694 | 8/1987 | (EP) . |
| 0232695 | 8/1987 | (EP) . |
| 0255137 | 2/1988 | (EP) . |
| 317057 | 5/1989 | (EP) . |
| 0365234 | 4/1990 | (EP) . |
| 0377533 | 7/1990 | (EP) . |
| 377447 | 7/1990 | (EP) . |
| 388730 | 9/1990 | (EP) . |
| 0407834 | 1/1991 | (EP) . |
| 0440970 | 8/1991 | (EP) . |
| 0517171 | 12/1992 | (EP) . |
| 0752448 | 1/1997 | (EP) . |
| 54157157 | 12/1979 | (JP) . |
| 60040182 | 3/1985 | (JP) . |
| 63186703 | 8/1988 | (JP) . |
| 64001786 | 1/1989 | (JP) . |
| 1123854 | 5/1989 | (JP) . |
| 1163254 | 6/1989 | (JP) . |
| 2016145 | 1/1990 | (JP) . |
| 2024346 | 1/1990 | (JP) . |
| 2155944 | 6/1990 | (JP) . |
| 4175370 | 6/1992 | (JP) . |
| 04335002 | 11/1992 | (JP) . |
| 06184217 | 7/1994 | (JP) . |
| 9503803 | 4/1995 | (KR) . |
| WO 89/03860 | 5/1989 | (WO) . |
| WO 94/01482 | 1/1994 | (WO) . |
| WO 95/22570 | 8/1995 | (WO) . |
| WO 96/30428 | 10/1996 | (WO) . |
| WO 98/02479 | 1/1998 | (WO) . |

OTHER PUBLICATIONS

Majumdar et al., "Effect of Extruder Type on the Properties and Morphology of Reactive Blends Based on Polyamides," *Journal of Applied Polymer Science*, 54, 339–354 (1994).

Flexman, E.A., "Toughened Semicrystalline Engineering Polymers: Morphology, Impact Resistance and Fracture Mechanisms," *Toughened Plastics I*, 79–104 (1993).

Hobbs et al., "Toughened Nylon Resins," *Polymer Engineering and Science*, vol. 23, 7, 380–389 (1993).

*Primary Examiner*—Margaret G. Moore
(74) *Attorney, Agent, or Firm*—Bernard J. Graves, Jr., Esq.

(57) ABSTRACT

In one aspect, the invention provides a method of making a nylon 6/silicone polymer blend comprising the steps of preparing a silicone polymer emulsion comprising a silicone polymer dispersed in a liquid continuous phase; introducing the silicone polymer emulsion into a nylon 6 ring opening reaction either prior to or during the nylon 6 ring opening reaction medium wherein the reaction medium comprises caprolactam; and opening the ring and reacting the caprolactam, thereby providing a nylon 6/silicone polymer emulsion blend. Nylon 6/silicone polymer blends are also provided by the invention herein.

6 Claims, No Drawings

U.S. PATENT DOCUMENTS

| | | |
|---|---|---|
| 5,061,766 | 10/1991 | Yamashita et al. . |
| 5,189,107 | 2/1993 | Kasai et al. . |
| 5,250,621 | 10/1993 | Lütjens et al. . |
| 5,270,380 | 12/1993 | Adamson et al. . |
| 5,274,065 | 12/1993 | Veith ............... 528/26 |
| 5,300,555 | 4/1994 | Weih et al. . |
| 5,344,675 | 9/1994 | Snyder . |
| 5,349,029 | 9/1994 | Nam . |
| 5,358,981 | 10/1994 | Southwick . |
| 5,409,967 | 4/1995 | Carson et al. . |
| 5,559,159 | 9/1996 | Sublett et al. ............... 521/48.5 |
| 5,594,059 | 1/1997 | Mason et al. . |
| 5,612,407 | 3/1997 | Southwick . |
| 5,652,306 | 7/1997 | Meyer et al. . |
| 5,674,937 | 10/1997 | Berg et al. . |
| 5,677,366 | 10/1997 | Wu . |
| 5,891,950 | 4/1999 | Collins et al. . |

* cited by examiner

NYLON 6/SILICONE BLENDS

CROSS-REFERENCE TO RELATED APPLICATION CROSS-REFERENCE TO RELATED APPLICATION

This application claims priority to U.S. Provisional Application Ser. No. 60/140,256, filed Jun. 18, 1999, the disclosure of which is incorporated herein by this reference in its entirety.

FIELD OF THE INVENTION

The present invention relates to processes for making nylon 6 polymer compositions that are modified with a silicone polymer emulsion comprising a silicone polymer to provide a nylon 6/silicone polymer blend. The silicone polymer emulsion may comprise water, diol, caprolactam, or a mixture thereof. The silicone polymer emulsion may also optionally comprise cosolvents. The invention further relates to nylon 6/silicone polymer blends.

BACKGROUND OF THE INVENTION

Silicone rubber has been utilized as a low Tg polymer for modifying polymers, such as polyamides. U.S. Pat. No. 5,610,223 discusses the mixing of silicone rubber powder into polyamide. This composition is a physical blend of silicone rubber and polyamide. Such melt mixing techniques are expensive and time consuming; thus, it would be beneficial to be able to combine silicone polymers with materials such as polyamide without the need for such mixing.

There exists a need for a process for producing a polymer blend by more economical methods. Such a need has been solved by the present invention, which can achieve such a blend in a polymerization reactor, wherein the physical properties of the condensation polymer are maintained or improved.

SUMMARY OF THE INVENTION

In one aspect, the invention provides a method of making a nylon 6/silicone polymer blend comprising the steps of:
 a. preparing a silicone polymer emulsion comprising a silicone polymer dispersed in a liquid continuous phase;
 b. introducing the silicone polymer emulsion into a nylon 6 ring opening reaction either prior to or during the nylon 6 ring opening reaction medium, wherein the reaction medium comprises caprolactam; and
 c. opening the ring and reacting the caprolactam, thereby providing a nylon 6/silicone polymer blend.

In another aspect, the invention provides a nylon 6/silicone polymer blend comprising nylon 6 and a silicone polymer emulsion, wherein the silicone polymer of the nylon 6/silicone polymer blend is derived from a silicone polymer emulsion, wherein the blend is formed by introducing the silicone polymer emulsion into a nylon 6 ring opening reaction either prior to or during the nylon 6 ring opening reaction medium and wherein the reaction medium comprises caprolactam.

Still further, the invention provides introducing a silicone polymer emulsion into a nylon 6 polymer, followed by extrusion, thereby providing a nylon 6/silicone polymer blend.

Additional advantages of the invention will be set forth in part in the description which follows, and in part will be apparent from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a" "an" and "the" include plural referents unless the context clearly dictates otherwise.

"Optional" or "optionally" means that the subsequently described event or circumstances may or may not occur, and that the description included instances where said event or circumstance occurs and instances where it does not.

"Silicone polymer emulsion" is herein defined as a dispersion of polymeric particles in a continuous phase, the polymeric particles preferably having a size range of from about 0.10 to about 1000 microns. Further preferably, the polymeric polymers have a particle size of from about 0.1 to about 10 microns. The silicone polymers of the present invention preferably have a molecular weight of about 5,000 to about 1,000,000 Daltons. The polymeric particles are preferably produced through emulsion polymerization processes. Alternatively, such emulsions may be prepared through direct emulsification e.g., mechanical emulsification processes.

As used herein, nylon 6 is a polymer of caprolactam.

The abbreviation "nm" means nanometers. "Tg" means glass transition temperature.

Throughout this application, where publications are referenced, the disclosures of these publications in their entireties are hereby incorporated by reference into this application to more fully describe the state of the art to which this invention pertains.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

In a major aspect, the invention is concerned with the introduction of a silicone polymer into a nylon 6 ring opening reaction wherein the silicone polymer is preferably introduced via a silicone polymer emulsion. The silicone polymer emulsion may comprise water, caprolactam., or a mixture thereof. Polymer blends made by these methods are also provided. The silicone polymer emulsion may also be added to a fully formed nylon 6 polymer, followed by extrusion to provide a nylon 6/silicone polymer blend.

I. Silicone Polymer Emulsion

In one embodiment, the aqueous silicone polymer emulsions of the present invention comprise a plurality of particles of a silicone polymer dispersed in a continuous phase. The silicone polymers of the present invention may preferably have functional groups. Such functional groups may comprise amino, epoxy, vinyl, mercapto, carbonate, isocyanate or silicone hydride. In a particularly preferred embodiment, the silicone polymer is a silanol terminated polydiorganosiloxane ("PDOS"). Other preferred silicone polymers include alkylmethylsiloxanes or aminopropylsiloxanes.

The silicone polymer emulsion preferably contains at least one surfactant that stabilizes the dispersed silicone polymer particles in the continuous phase of the emulsion. The silicone polymer in the emulsion should preferably have an average particle size from about 0.1 to about 1000 microns, more preferably from about 0.1 to about 10 microns. Such emulsions may be prepared, for example, by methods wherein a cyclic or linear oligomeric silicone polymer, such as PDOS, are dispersed in an aqueous continuous phase with the aid of the above mentioned surfactant and are thereafter emulsion polymerized by the introduction of an acid or base catalyst. Such emulsions can be illustrated by the disclosures of, among others, U.S. Pat. Nos. 4,954,565, 4,618,642, 3,294,725, and 2,891,920, the disclosures of which are each hereby incorporated herein in their entireties by this reference.

In a preferred embodiment, the silicone polymer emulsions are prepared by a direct emulsification process. In this process, a mixture of the continuous phase liquid i.e., water and/or, caprolactam and one or more surfactants are processed with a silicone polymer dispersed phase under high shear conditions using either conventional mixing equipment or high shear devices such as a Microfluidizer™. Methods for preparing these polymer emulsions are given in U.S. Pat. Nos. 4,177,177 and 4,788,001, the disclosures of which are each herein incorporated in their entireties by this reference. For example, PDOS can be added to a surfactant and then water, and/or caprolactam can be slowly added with constant shear. The resulting PDOS emulsions can then be crosslinked using common methods known to crosslink the PDOS.

In still a further embodiment, the continuous phase comprises a water component, wherein the water component is present in an amount of from about 1 to about 100% by weight, based upon the total weight of the continuous phase, and further preferably, about 10 to about 100% by weight, based upon the total weight of the continuous phase, and still preferably, from about 20 to about 100% by weight, based upon the total weight of the continuous phase. Further preferably, the water component is present at from about 30 to about 100%, based upon the total weight of the continuous phase, still preferably, from about 40 to about 100% by weight of the continuous phase, still further preferably, from about 50 to about 100% by weight of the continuous phase. In yet further preferred embodiments, the water component is present at from about 60 to about 100% by weight of the continuous phase, further preferably, from about 70 to about 100% by weight of the continuous phase, still preferably, from about 80 to about 100% by weight of the continuous phase, and, still further preferably, from about 90 to about 100% by weight of the continuous phase.

In a further preferred embodiment of the invention herein, the continuous phase of the silicone polymer emulsions of the present invention include a caprolactam component. In a preferred embodiment, the caprolactam is present in the amount of from about 1 to about 90% by weight, further preferably, from about 10 to about 90% by weight of the continuous phase, still preferably, from about 20 to about 90% by weight of the continuous phase, and, further preferably, from about 30 to about 90% by weight, based on the total weight of the continuous phase. In further preferred embodiments, the caprolactam component comprises from about 40 to about 90% by weight of the continuous phase. Still preferably, the caprolactam comprises from about 50 to about 90% by weight, based on the total weight of the continuous phase, and, further preferably, from about 60 to about 90% by weight, based on the total weight of the continuous phase, and, still preferably, from about 70 to about 90% by weight, based on the total weight of the continuous phase. In a further preferred embodiment, the caprolactam component comprises from about 80 to about 90% by weight of the continuous phase.

The total weight of the continuous phase of the silicone polymer emulsions includes the weight of the water component, caprolactam component and any cosolvent. The weight of any surfactant or additional components is not included in the total weight of the continuous phase.

In a preferred embodiment, a surfactant is used to prepare the silicone polymer emulsions. One of skill in the art would recognize that the type and amount of surfactant used in the preparation of the emulsions depends on the particular monomer combinations and the polymerization conditions. Surfactants used in the emulsification may be anionic, cationic, or nonionic surfactants. Anionic surfactants that may be used in the invention include surfactants such as alkali metal or ammonium salts of alkyl, aryl or alkylaryl sulfonates, sulfates, phosphates or a mixture thereof. Further, suitable nonionic surfactants include, but are not limited to, alkyl and alkylaryl polydiol ethers, such as ethoxylation products of lauryl, oleyl and stearyl alcohol, alkyl phenol glycol ethers, including but not limited to, ethoxylation products of octyl or nonylphenol. Suitable surfactants may be found in McCutcheon 's Volume I: *Emulsifiers and Detergents* 1996 *North American Edition*, MC Publishing Co., Glen Rock, N.J., 1996.

The continuous phase of the silicone polymer emulsion may also comprise a cosolvent. These cosolvents include, but are not limited to water, methanol, ethanol, propanol, n-butanol, or a mixture thereof. The cosolvent may be present in the amount of less than about 60% by weight, more preferably less than about 40% by weight, based on the total weight of the continuous phase of the silicone polymer emulsion.

Preferably, the silicone polymers utilized to form the emulsions of the present invention may be crosslinked prior to addition of the emulsion to a nylon 6 reaction, as further set out below. Many methods are present in the literature to crosslink silicone polymer emulsions. For example, U.S. Pat. No. 4,370,160 discloses microparticles, such as microspheres and microcapsules, comprising a solid PDOS prepared by irradiation of a dispersion of discrete particles with ultraviolet light. The discrete particles are dispersed in a U.V. transparent fluid continuous phase and are sphere-like particles of a U.V. curable, liquid PDOS component containing a material to be encapsulated.

In another example, U.S. Pat. No. 4,618,642 discloses how to crosslink aqueous emulsions of silicone particles. The crosslinking is carried out by mixing an anionic emulsion containing dispersed particles of hydroxyl functional PDOS, a dialkyltindicarboxylate and a trifunctional organosilane. U.S. Pat. No. 5,674,937, also discloses methods of curing phase inverted silicone polymer emulsions.

The silicone polymer emulsions of this present invention may also be prepared by emulsion polymerization techniques. Such emulsions may be prepared, for example, by methods wherein a cyclic or linear oligomer siloxane polymer, such as PDOS, are dispersed in a glycol continuous phase with the aid of a surfactant and are thereafter emulsion polymerized by the introduction of an acid or base catalyst. Examples of suitable acid and base catalysts are illustrated in the disclosures of, for example, U.S. Pat. Nos. 4,954,595, 4,618,642, 3,294,725 and 2,891,920.

Buffering agents may also be utilized in the emulsion polymerization to control the pH of the reaction. Suitable buffering agents include, but are not limited to, ammonium and sodium salts of carbonates and bicarbonates. It is preferred that the buffering agents be included when using acid generating initiators, including, but not limited to, the salts of persulfates.

II. Incorporation of a Silicone Polymer into a Nylon 6 Polymer

In a major embodiment, the invention concerns the introduction of a silicone polymer emulsion into a reaction that forms a nylon 6 polymer, resulting in a polymer blend having a silicone polymer dispersed within a nylon 6 polymer matrix.

When the silicone polymer emulsion utilized comprises a water component, the water may be present in an amount of from about 10 to about 100% by weight of the continuous phase, more preferably from about 20 to about 100% by weight of the continuous phase, still preferably, from about 30 to about 100% by weight of the continuous phase. In a further preferred embodiment, the water may be present at about 40 to about 100% by weight of the continuous phase, more preferably, from about 50 to about 100% by weight of the continuous phase, and, still preferably, from about 60 to about 100% by weight of the continuous phase. In further preferred embodiments, the water may be present at from about 70 to about 100% by weight of the continuous phase, and, further preferably, at from about 80 to about 100% by weight of the continuous phase and, still preferably, from about 90 to about 100% by weight of the continuous phase. In yet another embodiment, the continuous phase consists essentially of water.

When the silicone polymer emulsion comprises caprolactam, the caprolactam in the silicone polymer emulsion preferably co-reacts with the caprolactam in conjunction with the nylon 6 polymerization reaction. In embodiments of the invention herein, the caprolactam component is present in the silicone polymer emulsion in an amount of from about 1 to about 90% by weight of the continuous phase, further preferably, from about 10 to about 90% by weight of the continuous phase, still preferably, from about 20 to about 90% by weight of the continuous phase, and, further preferably, about 30 to about 90% by weight, based on the total weight of the continuous phase. In a further preferred embodiment, the caprolactam component comprises from about 40 to about 90% by weight of the continuous phase. Still preferably, the caprolactam comprises from about 50 to about 90% by weight, based on the total weight of the continuous phase, and, further preferably, from about 60 to about 90% by weight, based on the total weight of the continuous phase, and, still preferably, from about 70 to about 90% by weight, based on the total weight of the continuous phase. In a further preferred embodiment, the caprolactam component comprises from about 80 to about 90% by weight of the continuous phase.

Further, the silicone polymer emulsions set forth above in Section I may be utilized for the polymer blends of the present invention.

The polymerization of caprolactam, for example, in conjunction with a nylon 6 ring opening reaction, can be accomplished by methods known in the art. For example, U.S. Pat. No. 4,204,049 discloses methods for polymerizing caprolactam in the presence of water. Typically, e-caprolactam is placed in a pressurized vessel, such as an autoclave, along with water and, optionally, a catalyst. The mixture is heated to about 200 to about 280° C. for a period of time to produce a mixture of aminocaproic acid polymer, aminocaproic acid, unreacted lactam and water. The pressure is then released, the water allowed to escape, and the second stage of the reaction carried out by heating at about 220 to about 300° C. under atmospheric or subatmospheric pressure. Catalysts can be added to the polymerization to facilitate the reaction. Some examples of suitable catalysts are high boiling amines as disclosed in U.S. Pat. No. 4,366,306, or acidic species, such as acetic acid.

In a further embodiment, the water, and/or caprolactam components may be present in either the continuous phase of the silicone polymer emulsion, the nylon 6 ring opening reaction medium, or both. As noted, the silicone polymer emulsion may be introduced into the nylon 6 ring opening reaction medium at various stages of the polymerization.

Alternatively, the silicone polymer emulsion may be blended into the fully or partially formed nylon 6 polymer directly in an extruder at temperatures from about 200 to about 320° C. In this process, since the silicone polymer emulsion is added directly to the polyamide polymer, there is no need to harvest the silicone polymer from the silicone polymer emulsion.

The silicone polymer in the silicone polymer emulsion may be preferably comprised of functional groups. In a preferred embodiment, the functional groups comprise the following groups: esters, acids, alcohols, isocyanates, epoxy or anhydrides.

The process of the invention does not require the isolation of the silicone polymer in the silicone polymer emulsion from the continuous phase, for example, by spray drying. Thus, the present invention overcomes the necessity of preparing a core-shell polymer or the necessity of harvesting the polymer from the emulsion. Further, since blending takes place during the preparation of the nylon 6 polymer in the polymerization reactor, there is no need for a polymer/polymer post blending step that is energy intensive, expensive and often leads to the reduction of the molecular weight of the nylon 6 polymer.

The silicone polymer emulsion may be introduced into the nylon 6 polymerization reaction at various stages. For example, in a nylon 6 polymerization, the silicone polymer emulsion can be added 1) "up-front" with the caprolactam starting materials; 2) after initiation of the polymerization; 3) during the ring opening polymerization; or 4) near the completion of the polymerization. The final blend can be affected by the time at which the silicone polymer emulsion is added. While not wishing to be bound by any mechanism, it is believed that the size and shape of the silicone polymer in the nylon 6 polymer blend can be affected by the time of the addition of the silicone polymer emulsion. Also, particular chemical interaction between the silicone polymer and nylon 6 polymers is affected by time of addition, and they, in consequence, affect final blend properties.

The amount of silicone polymer in the nylon 6/ silicone polymer blend may comprise a wide range of values. However, it is particularly preferred that the amount of silicone polymer in the blend is greater than about 5% by weight of the blend. Still further, it is preferred that the amount of silicone polymer in the nylon 6/ silicone polymer blend be from greater than about 5 to about 50% by weight of the blend, and, still further preferably, from greater than about 5 to about 25% by weight of the blend.

Other ingredients may optionally be added to the compositions of the present invention to enhance the performance properties of the nylon 6 polymer/silicone polymer matrix. For example, reinforcing agents, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, mixtures thereof, and the like, can be included herein. All of these additives and the use thereof are well known in the art. Any of these compounds can be used so long as they do not hinder the present invention from accomplishing its objects.

In a particularly preferred embodiment relating to the addition of reinforcing agents to the compositions of the present invention, glass fibers may be added to the nylon 6 compositions to provide particular advantages to the resulting compositions. Glass fibers that are preferred in the present invention conventionally have an average standard diameter of greater than about 5 microns, with a range of from about 1 to about 20 microns being particularly preferred. The length of the glass filaments, whether or not they are bundled into fibers, and whether the fibers are further bundled into yarns, ropes or rovings, and the like, are not critical to this invention. However, for the purpose of preparing the present compositions, it is preferable to use filamentous glass in the form of chopped strands of from about 1.5 mm to about 10 mm long, and preferably less than about 6 mm long. In the pellets and molded articles of the compositions, even shorter lengths will be encountered, because, during compounding, considerable fragmentation occurs. This is, however, desirable because the best properties are exhibited for injection molded articles where the filament lengths are between about 0.03 mm and about 1 mm. Especially preferred are glass fibers having an average standard diameter in the range of greater than about 5 microns, preferably about 5 microns to about 14 microns, and the average filament length dispersed in the molded articles being between about 0.15 and about 0.4 mm. Consequently, glass filaments are dispersed uniformly and the molded articles exhibit uniform and balanced mechanical properties, especially surface smoothness.

The amount of the glass fibers can vary broadly from about 10 to about 50% by weight, and most preferably about 10 to about 40% by weight, based on the total weight of the polymer blend. These glass fibers are typically conventionally sized with coupling agents, such as aminosilanes and epoxysilanes and titanates, and adhesion promoters such as epoxies, urethanes, cellulosics, starch, cyanurates, and the like.

In one embodiment, when the glass fiber is present in a polymer molding composition, the polymer composition is preferably from about 70 to about 85% by weight of the total composition based on the total weight percentages of the nylon 6 and silicone polymer in the compositions of the present invention, wherein the percentage equals 100%.

Examples of other reinforcing agents that are useful in addition to glass fibers, include, but are not limited to, carbon fibers, mica, clay, talc, wollastonite, calcium carbonate or a combination thereof. The polymer compositions of the invention may be reinforced with a mixture of glass and other reinforcing agents as described above, such as mica or talc, and/or with other additives.

In accordance with the invention herein, the glass fibers, as well as other reinforcing agents, may be introduced into the nylon 6 ring opening reaction at various stages of the process. In a particularly preferred embodiment of the invention herein, the glass fibers are added directly to the nylon 6 ring opening reaction. Since the glass fibers can be sufficiently blended during this stage, there is no need for a post-blending step, such as extrusion, to incorporate the glass fibers into the compositions. This is particularly advantageous to the present invention because a post-blending step is energy intensive, expensive and may often cause a reduction in the molecular weight of the nylon 6/silicone polymer blend.

In another embodiment of the invention, a modified nylon 6 polymer, including, but not limited to, an impact modified plastic, is produced from a silicone polymer emulsion comprising silicone polymers and a nylon 6 polymer. The silicone polymer of the silicone polymer emulsions in this embodiment has a Tg less than 40° C., while the nylon 6 polymer has a Tg greater than 40° C.

In a further preferred embodiment, nylon 6/silicone polymer blends are provided.

In a further preferred embodiment, an impact modified nylon 6 is prepared comprising a silicone polymer emulsion to provide a nylon 6/silicone polymer blend. In one particularly preferred embodiment of the invention, a modified nylon 6 polymer, including, but not limited to, an impact modified plastic, is produced from silicone polymer emulsions and a nylon 6 polymer.

End-use applications for the compositions of the nylon 6/silicone polymer blends produced according to the instant invention include impact-modified polymers, improved barrier polymers, and polymers having improved mechanical properties, such as improved tensile strength, improved elongation at break, better weathering properties, and improved flexural strength. Other end-use applications include engineering resins, and coatings. The polymer blends produced by this invention are useful for thermoplastic engineering resins, elastomers, films, sheets and container plastics.

EXAMPLES

The following example is put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

Example 1

Nylon 6/silicone Polymer Blend

To a 1 L glass lined autoclave 187 g of e-caprolactam is added and melted at 80° C. Then over a period of 5 minutes, 200 g of a silicone latex composition and 0.4 g of glacial acetic acid is added to the autoclave with continuous stirring.

While stirring, the mixture is pressurized to 250 psig and heated to 250° C. for 30 minutes. The pressure is then reduced to atmospheric over thirty minutes and the reaction is allowed to continue at atmospheric pressure while stirring for 1 hour. A nylon 6/silicone polymer blend is provided.

The invention has been described in detail with particular reference to preferred embodiments thereof, but it will be understood that variations and modifications can be effected without departing from the scope and spirit of the invention.

What is claimed is:

1. A method of making a nylon 6/silicone polymer blend comprising the steps of:
   a. preparing a silicone polymer emulsion comprising a silicone polymer dispersed in a liquid continuous phase, wherein the liquid continuous phase comprises a caprolactam component;
   b. introducing the silicone polymer emulsion into a nylon 6 ring opening reaction medium either prior to or during the nylon 6 ring opening reaction, wherein the reaction medium comprises caprolactam; and
   c. opening the ring and reacting the caprolactam, thereby providing a nylon 6/silicone polymer blend.

2. The method of claim 1, wherein the continuous phase comprises water.

3. The method of claim 1, wherein the continuous phase comprises from about 10 to about 90% by weight caprolactam.

4. The method of claim 1, wherein the silicone polymer comprises homo or copolymers of polydimethylsiloxane, wherein the copolymers comprise aminopropyl, vinyl, mercaptopropyl, phenylmethyl, epoxy or aminoethylaminopropyl functionalities.

5. The method of claim 1, wherein the silicone polymer emulsion comprises a surfactant and wherein the surfactant comprises an anionic surfactant, a cationic surfactant, nonionic surfactant, or a mixture thereof.

6. The method of claim 1, wherein glass fibers are added to the nylon 6 reaction medium prior to or during the nylon 6 ring opening reaction.

* * * * *